Oct. 6, 1970  D. S. WISE  3,532,984
R.M.S. VOLTMETER WITH IMPEDANCE CONVERSION AND ISOLATION MEANS
Filed Jan. 9, 1967

INVENTOR.
David S. Wise
BY *J. V. Douglass*
*His atty.*

United States Patent Office 3,532,984
Patented Oct. 6, 1970

3,532,984
R.M.S. VOLTMETER WITH IMPEDANCE CONVERSION AND ISOLATION MEANS
David S. Wise, Cleveland, Ohio, assignor to Western Reserve Electronics Inc., Cleveland, Ohio, a corporation of Ohio
Filed Jan. 9, 1967, Ser. No. 607,971
Int. Cl. G01r 15/10, 1/30
U.S. Cl. 324—132
10 Claims

ABSTRACT OF THE DISCLOSURE

An R.M.S. alternating current measuring device for complex waves includes a meter across a bridge circuit having a pair of tunnel diodes in a pair of the legs and capacitors in the opposite legs. A circuit in series with the bridge is provided having a first part to compensate on the lower end of the voltage response curve and another in shunt therewith to compensate for the higher end of the response to provide true R.M.S. reading for complex waves. An impedance conversion and isolation circuit is interposed between the meter circuit and the source being measured. A circuit precedes the last-mentioned circuit to change the input current or voltage thereto to unity.

---

This invention relates to means for accurately measuring the R.M.S. value of alternating currents and voltages.

An apparatus for measuring the R.M.S. value of alternating currents and voltages where a meter is connected across a bridge circuit, the two adjacent legs having tunnel diodes acting in the backward region and the other two legs each contain a capacitance. The current response is controlled by a compensating network comprised of a resistance means in series with the meter and a second resistance means in series with the bridge, comprised of a resistance and a shunt therefor which in turn is comprised of a second resistance and a pair of diodes in parallel and back-to-back in series with the second resistance, the last resistance means changes in value as the voltage rises beyond a certain point. Impedance converting means is interposed in the leads to isolate the voltage source being measured from the voltage measuring means and prevent changes in impedance from the source from being transmitted to the measuring circuit.

Recently there has been a greater need for a portable, rugged, self-contained and accurate instrument for making true R.M.S. measurements. This is particularly true with the advent of the silicon controlled rectifier, the output of that may have a complex wave form which prevents accurate R.M.S. voltage or current measurements with conventional equipment.

The present invention is an improvement in the alternating current measuring circuit over that shown in my Pat. No. 3,356,943 of Dec. 5, 1967, to which reference may be had for a more detailed explanation of certain parts.

In the above cited patent there was illustrated and claimed an alternating current indicator which was used in conjunction with circuit means for providing a fixed amount of voltage or current to the indicator, whereby the indicator could be made to operate at a fixed point, or unity. The voltage or current was determined by the value of the elements inserted in the circuit means to reduce the voltage or current to unity. The indicator in the aforesaid patent included a bridge circuit where two adjacent legs were connected at their junction to one side of a source which, in this instance, was the circuitry for reducing the voltage or current to unity. Each of the legs had a tunnel diode therein, the diodes in the adjacent legs operating in opposite directions. They were also arranged to operate in the backward region. The other two legs each contained a capacitor and their junctions connected to the other side of the source. The meter or idicator was connected across the bridge.

Although the above device was very useful in the measuring of alternating current and voltage and did have a response on sine waves which was calibrated in terms of R.M.S., it was found that when the wave form departed from the sinusoidal the reading was not necessarily true R.M.S. It was further found that the wave form response of the indicator was highly dependent on the impedance of the source. It will be realized that the utility of a meter of this class can be greatly extended if it can be made to indicate true R.M.S. in the presence of wave forms that vary greatly from sinusoidal and wherein the crest factor may be as much as 10 to 1.

Heretofore true R.M.S. meters have been manufactured, but largely the measurements made by devices which used thermocouples. These devices had certain inherent disadvantages including expense, sensitivity to burn out on overload, fragility, slow response time and insensitivity.

When the device of the present invention is calibrated at one point, it may be inserted in the circuitry in place of the A.C. indicator of my prior patent and provide an instrument of high accuracy and reliability heretofore unavailable for making true R.M.S. measurements.

It is capable of measuring R.M.S. voltage of complex wave form to an accuracy of 1% of indicated value over a voltage range of 100 millivolts to 1000 volts and frequency range from 10 cycles to 100,000 cycles, with a crest factor up to 10 to 1 and a loading of the circuit of approximately 40 microamps.

Figure 1:
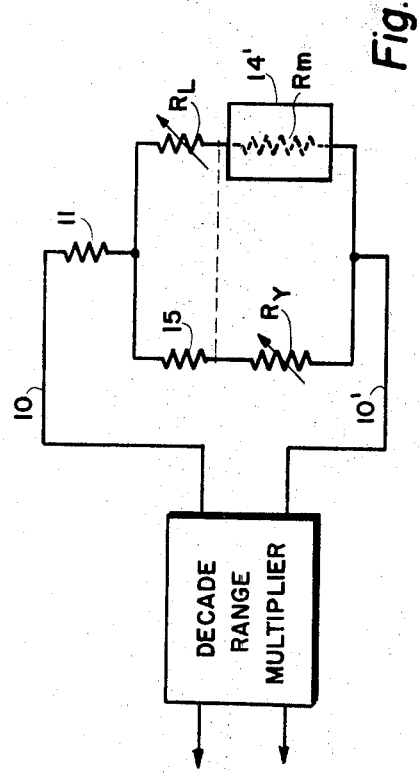
FIG. 1 is a diagram showing the broad concept of the invention.

FIG. 1 is a diagram of the circuit as broadly described in my above-mentioned patent and includes a decade range multiplier which converts the voltage or current being measured to the lower level in the base decade and digital resolver. The multiplier connects to a digital resolver through the input terminal 10–10′. One of these terminals connects to the fixed resistance 15 and the first series resistance $R_y$ which in turn are connected in parallel with a second variable resistance $R_r$ in series with the resistance of the indicator 14′.

As pointed out in the patent, the means with the block 14′ is an indicator which may be a meter having a resistance $R_m$ and where the resistors $R_y$ and $R_r$ are adjusted to make the indicator indicate at a predetermined point, which is unity. The value of the current or voltage is read from the dial means which inserted resistors $R_y$ and $R_r$. It was also pointed out that a connection could be made between the junction of resistors 15–$R_y$ and $R_r$–14′. The new combination comprises the substitution for the indicator 14′ of FIG. 1, the circuit shown in FIG. 2. Basically the substituted circuit includes an indicator; means to compensate it for true R.M.S. wave form response; and impedance converting means for isolation or buffering the measured source from the indicator.

It will be appreciated that the impedance converter means and compensated indicator may be useful in places other than in the combination with the digital scaler such as in conjunction with conventional analog instruments.

Figure 2:
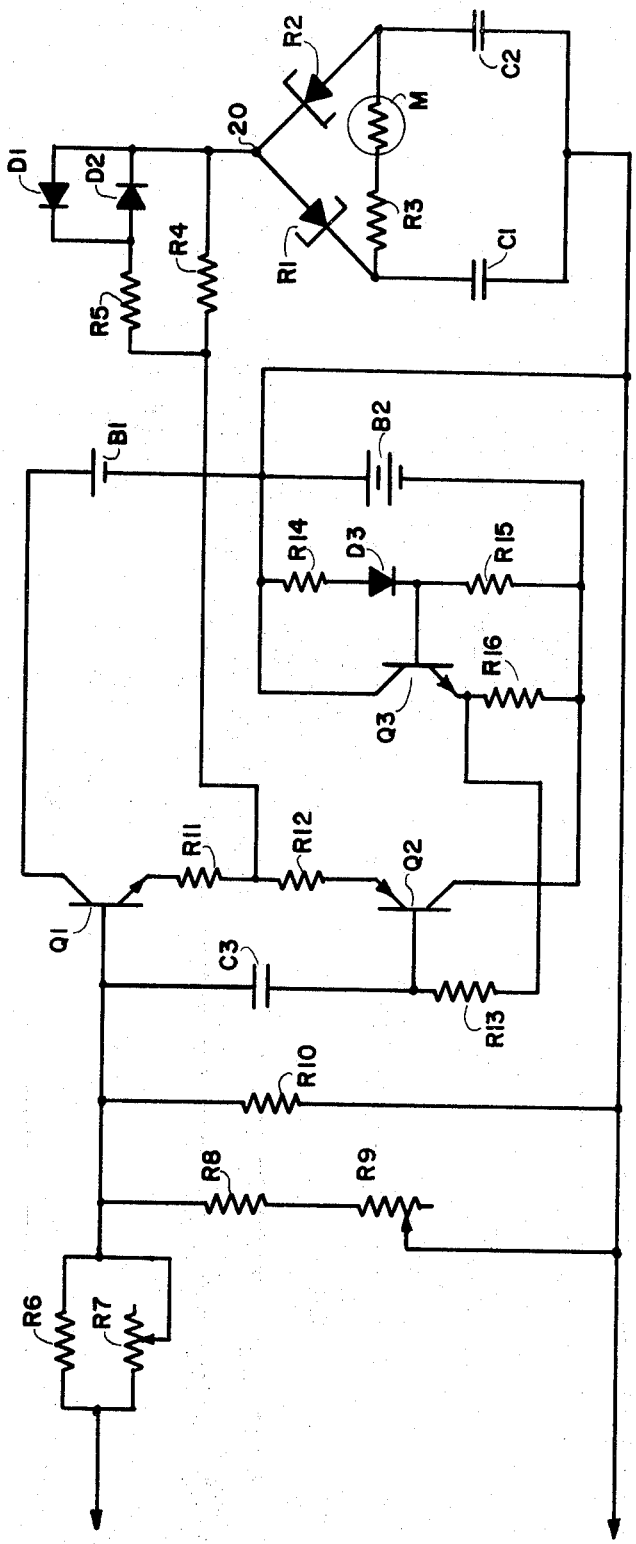
FIG. 2 is a detailed diagram illustrating the specific concept of the invention.

The circuit of FIG 2 includes the bridge having the tunnel diodes $R_1$ and $R_2$ disposed in the upper adjacent legs and the condensers $C_1$ and $C_2$ in the lower adjacent legs. The indicator may be a meter M, having a resistance, in series with a resistance $R_3$, disposed across the bridge.

It will be appreciated that it is desirable that the response of the indicator be such that the current varies proportionate to the square of the voltage applied. With a device such as shown in the aforesaid patent, the response curve was found to deviate, depending upon the wave form, to such an extent that the indications were not true R.M.S., the response being greater or less than the square of the voltage and deviated with the source impedance. Therefore the present invention includes means for changing the response curve to that desired and for isolating the indicator from the source impedance. In this respect there is provided a compensating network to the input 20 of the bridge which includes a resistance means which causes the response to fall on the more desired theoretical line. The means includes a first resistance $R_4$ which changed the response from zero voltage upward which is in substance an over-correction at the upper end of the curve. The resistance $R_4$ is shunted by a second resistance means which is voltage sensitive and shifts the curve back to the desired position as the voltage rises, and includes a resistance $R_5$ in series with a pair of parallel diodes $D_1$–$D_2$ connected back-to-back. When the voltage being measured is at the lower end of the response curve, the resistor $R_4$ is practically the only compensating resistor in effect. As the voltage rises the diodes $D_1$–$D_2$, which may be germanium, start to conduct, reducing the value of the total resistance. Eventually the diodes conduct full current at which time the resistance $R_5$ predominates in the compensating circuit. The resistance $R_3$ in series with the meter is used to correct for the effect of resistance $R_4$ on the lower end of the responsive curve. By suitable selection of resistors the response of the indicator can be made substantially linear and in proportion to the square of the applied voltage; thus true R.M.S. measurements can be realized with crest factors up to 10:1.

The impedance converting and isolating circuit is disposed between the source of current being measured and the indicator and its compensating circuit. Since impedance of the source will vary greatly, the function of this circuit is to prevent the impedance of the source from altering the R.M.S. wave form response of the compensated indicator by isolating the source being measured from the indicator and converting the impedance from the source to the desired low value.

It includes the input circuit for reducing the impedance, looking into the circuit, to 2400 ohms and also for adjusting the sensitivity level.

The resistance $R_6$ and its shunting variable resistor $R_7$ adjusts the sensitivity. The resistance $R_8$ and variable resistance $R_9$ in shunt with $R_{10}$ and across the input provide the desired input resistance. $R_{10}$ is the main shunting resistance and the others are for adjustment purposes.

The normal impedance of the succeeding circuit is very high and the resistance $R_{10}$ is so low as compared to the remainder of the following circuit that small changes in the following circuit will have negligible effect on the input impedance.

The remainder of the circuit is a dual emitter follower circuit using complementary transistors in the input in an arrangement that effects unity gain to transmit the signal, in the presence of high crest factor, provide the desired isolation, and a constant low value impedance for driving the indicator. A transistor is used to provide the bias to one of the complementary transistors.

The signal from the upper of the two lines extending from opposite ends of the resistor $R_{10}$ connects to the base of the NPN transistor $Q_1$ and is coupled through the capacitor $C_3$ to the base of the PNP transistor $Q_2$. The emitters of $Q_1$ and $Q_2$ are connected together by small resistors $R_{11}$ and $R_{12}$. These resistors provide bias stabilization. The signal is to be transmitted to the line which connects to the indicator circuit, without distortion or substantial attenuation while providing the isolation and impedance conversion. The signal on the bases of $Q_1$ and $Q_2$ are in same phase. By emitter follower action the signals at the junction of the lines from the two emitters are in phase.

The use of two transistors in the above described configuration provides the desired signal transfer without signal loss, the transfer being substantially unity.

Collector current for $Q_1$ is furnished from battery $B_1$. Collector current for $Q_2$ is furnished from battery $B_2$ which is serially connected to $B_1$. The junction of batteries $B_1$ and $B_2$ is connected to the base of $Q_1$ through resistor $R_{10}$ to provide its bias. Bias for the base of $Q_2$ is through resistor $R_{13}$ from the emitter follower $Q_3$. The base of the emitter follower $Q_3$ is biased by a voltage divider across the battery $B_2$ and comprised of the serially connected resistor $R_{14}$, diode $D_3$ and resistor $R_{15}$. The base of $Q_3$ connects to the junction of diode $D_3$ and resistor $R_{15}$. The emitter of $Q_3$ is returned to the negative terminal of $B_2$ through the resistor $R_{16}$. The collector of $Q_3$ connects to the positive terminal of $B_2$. The diode $D_3$ in combination with the base emitter junction of $Q_3$ is used to compensate for temperature change in the transistors $Q_1$ and $Q_2$ by adjusting the bias on $Q_2$.

It will thus be seen that in addition to the advantages enumerated above that with the above configuration and the complementary transistors, the circuit is able to handle currents with a high crest factor since transistor $Q_1$ can draw the desired current on the positive excursions and $Q_2$ can draw the desired current on the negative excursions.

Having thus described the invention in some embodiments thereof, I am aware that numerous and extensive departures may be made therefrom without departing from the spirit or scope of the invention as defined by the appended claims.

I claim:

1. An apparatus for measuring the true R.M.S. of an alternating current or voltage source of sinusoidal or non-sinusoidal waveforms comprising an impedance conversion and isolation circuit means having its input connected to the source of voltage or current to be measured and an alternating current and voltage indicating means connected to the output of said conversion and isolation means, said indicating means including a bridge circuit, including an indicator connected across the bridge output, for providing a substantially true R.M.S. response, and a voltage squared compensating circuit means connected in series with the input to the bridge for providing true R.M.S. indications for sinusoidal or non-sinsoidal input signals.

2. An apparatus as described in claim 1, wherein said isolation means comprises a pair of complemnetary transisters having their bases connected to the voltage or current source and their emitters connected together by voltage divider means and connected to the indicator.

3. An apparatus as described in claim 1, wherein the bridge has two first adjacent legs with a tunnel diode in each leg and said diodes are connected in opposite directions and a second pair of legs is connected to the first legs and capacity means is provided in the second legs opposite to the first legs, and the junction of the legs with the diodes is connected to said compensating means.

4. An apparatus as described in claim 1, wherein there is inserted between the impedance and isolation means and the source of voltage or current being measured a means for reducing the voltage or current to unity comprising a first resistance and a first variable resistance connected to one terminal of said source of voltage or current, said indicating means having a fixed resistance, and second variable resistance and said indicating means are connected to the second terminal of the source of voltage or current and a second variable resistance is connected to the other end of the first fixed resistance and said indicating means is connected to the other end of the first variable resistance.

5. An apparaus as described in claim 1, wherein said compensating means comprises resistance means in series with the indicating means for controlling the voltage squared current between zero and a fixed place at the lower end of the curve and a second resistance means in series with the input to the bridge for controlling the voltage squared current at a higher point on said curve and a third resistance means responsive to an increase in voltage to change the value of said series input resistance.

6. An apparatus as described in claim 2, wherein means is provided between the source of voltage or current to be measured and said isolation means, shunted across said source of voltage or current to establish and control the input inpedance and sensitivity of the conversion and isolation means.

7. An apparatus as described in claim 2, wherein an emitter follower means is connected to the base and collector of one transistor, voltage divider means connected to the base and collector of one transistor, voltage divider means connected between base emitter and collector of the emitter follower and comprising a resistance connected to the collector, a diode connected to the resistance and a second resistance connected to the emitter with the junction between the diode and the second resistor connected to the base.

8. An apparatus as described in claim 3, wherein said isolation and impedance conversion means includes an input circuit comprised of a pair of complementary transistors in the input connected as emitter followers and with the emitters connected together to provide a common output.

9. An apparatus as described in claim 8, wherein there is inserted between the impedance and isolation means and the source of voltage or current being measured a means for reducing the voltage or current to unity comprising a first resistance and a first variable resistance connected to one terminal of said source of voltage or current and said indicating means has a fixed resistance, and a second variable resistance and said indicating means are connected to the second terminal of the source of voltage or current and the second variable resistance is connected to the other end of the first fixed resistance and said indicating means is connected to the other end of the first variable resistance.

10. An apparatus as described in claim 2, wherein a third transistor is connected as an emitter follower to and biases one of said complementary transistors.

References Cited

UNITED STATES PATENTS

| | | | |
|---|---|---|---|
| 2,521,522 | 9/1950 | Keitley | 324—19 XR |
| 3,041,535 | 6/1962 | Cochran | 324—132 XR |
| 3,064,192 | 11/1962 | Schwarzlander | 324—132 XR |
| 3,195,064 | 7/1965 | Offner | 330—13 |
| 3,256,475 | 6/1966 | Kelly | 307—321 XR |
| 3,268,813 | 8/1966 | Pendleton | 324—132 |
| 3,281,689 | 10/1966 | Schneider et al. | 324—119 XR |
| 3,360,727 | 12/1967 | Justice | 324—123 |
| 2,119,364 | 5/1938 | Smith | 324—115 |

FOREIGN PATENTS 860,681  2/1961  Great Britain.

RUDOLPH V. ROLINEC, Primary Examiner

E. F. KARLSEN, Assistant Examiner

U.S. Cl. X.R.

324—123; 328—144

UNITED STATES PATENT OFFICE
CERTIFICATE OF CORRECTION

Patent No. 3,532,984      Dated October 6, 1970

Inventor(s) David S. Wise

It is certified that error appears in the above-identified patent and that said Letters Patent are hereby corrected as shown below:

Col. 5, lines 17 and 18 (Claim 7, lines 3 and 4) delete: "voltage divider means connected to the base and collector of one transistor".

SIGNED AND SEALED
DEC 1 - 1970

(SEAL)
Attest:

Edward M. Fletcher, Jr.
Attesting Officer

WILLIAM E. SCHUYLER, JR.
Commissioner of Patents

FORM PO-1050 (10-69)